(No Model.)
J. G. GAITHER.
CULTIVATOR.
No. 399,868. Patented Mar. 19, 1889.
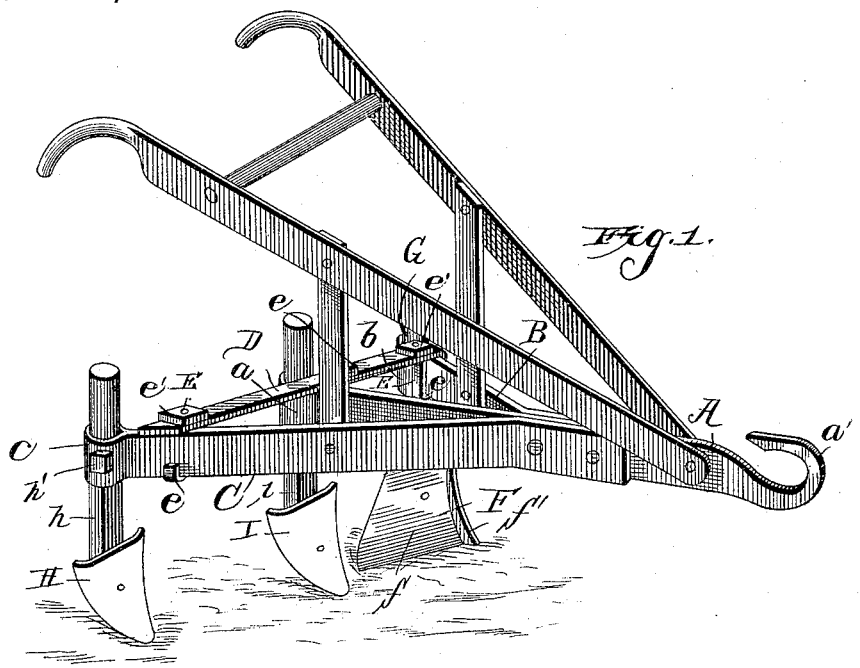
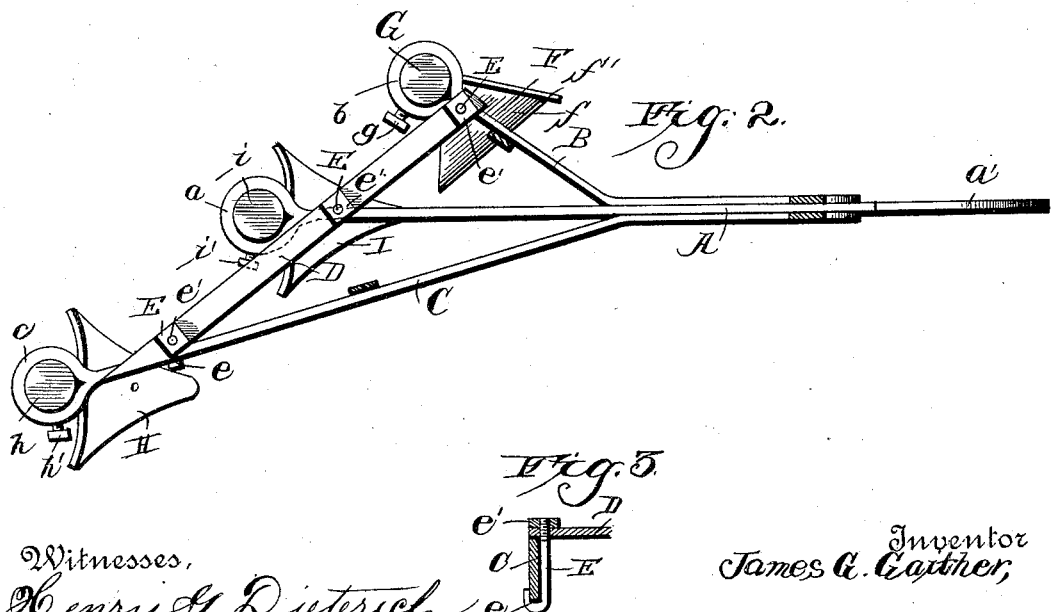
Witnesses,
Henry G. Dieterich
H. F. Riley
Inventor
James G. Gaither,
By his Attorneys

UNITED STATES PATENT OFFICE.

JAMES GREENFIELD GAITHER, OF WILLISTON, TENNESSEE.

CULTIVATOR.

SPECIFICATION forming part of Letters Patent No. 399,868, dated March 19, 1889.

Application filed October 20, 1888. Serial No. 288,683. (No model.)

*To all whom it may concern:*

Be it known that I, JAMES GREENFIELD GAITHER, a citizen of the United States, residing at Williston, in the county of Fayette and State of Tennessee, have invented a new and useful Improvement in Cultivators, of which the following is a specification.

The invention relates to improvements in cultivators, the object being to combine a scraper with the plows in such manner as to clear the rows of weeds and trash coincidently with making the furrow; and it consists in the construction and novel combination of parts hereinafter described, illustrated in the accompanying drawings, and pointed out in the appended claim.

Figure 1 of the drawings represents a perspective view of a cultivator embodying the invention. Fig. 2 represents a plan view thereof. Fig. 3 is a detail view showing the eyebolt-connection of the brace-bar to the beams.

Referring to the drawings by letter, A designates the plow-beam having at its rear end an integral vertical cylindrical eye, $a$, and at its front end the integral draft-hook $a'$, curved upward and rearward, as shown. The handles are of ordinary construction and rise from the plow-beam in rear of the draft-hook.

B C are supplemental beams bolted to opposite sides of the plow-beam in rear of the handles, and at a suitable point bent outward from said beam. The said beams terminate, respectively, in the integral eyes $b$ $c$, similar in all respects to the eye $a$. The beam B is shorter and makes a larger angle with the plow-beam than the beam C, and the eyes $a$ $b$ $c$, which are preferably equidistant, are aligned across the plow-beam at a suitable angle.

D is a stay-bar crossing the three beams immediately in front of the eyes, and connected to said beams by the bolts E, each of which has a hook, $e$, at its lower end engaging under the lower edge of the corresponding beam, and is engaged by a nut, $e'$, above the bar D through a suitable opening, in which it passes.

F is a scraper-blade curved downward and forward, having a horizontal lower edge, $f$, and provided on its outer edge with a forwardly-projecting flange, $f'$, gradually increasing in width downward.

G is the standard, to the front of which the scraper is secured by bolts or otherwise, which standard is cylindrical and fits in the eye $b$, so that it can be rotated therein and can be adjusted vertically by means of the set-screw $g$, which passes through a threaded opening in said eye.

H I are similar plow-points having cylindrical standards $h$ $i$, equal in size to the standard G, and respectively fitted into the eyes $a$ $c$, in which they are rendered vertically adjustable by means of the set-screws $h'$ $i'$, similar to the set-screw $g$. The standards, with their attached points or shovels, are mutually interchangeable; but their arrangement to scrape and cultivate the soil is as heretofore described. The scraper cuts the weeds and throws the refuse and trash from the rows and the following plows make the furrows. The plows and scraper may be set at any desired angle by turning their standards more or less, and can have their heights adjusted by means of the set-screws, as described.

Having described my invention, I claim—

The improved cultivator herein described and shown, comprising the main beam A, having an eye, $a$, at its rear end and a hook, $a'$, at its front end, the diverging beams B C, having their front ends secured to the beam A and their rear ends provided with eyes $b$ $c$, the standards adjustably secured in the eyes $a$ $b$ $c$, the diagonal brace-bar extending over and resting upon the rear ends of the beams A B C, the bolts inserted through said brace-bar and having integral hooks on their lower ends engaging the lower edges of the beams A B C, and the nuts on the upper ends of the bolts turning against the brace-bar, as set forth.

In testimony that I claim the foregoing as my own I have hereto affixed my signature in presence of two witnesses.

JAMES GREENFIELD GAITHER.

Witnesses:
 JAMES F. BARRON,
 W. E. GAITHER.